March 26, 1963  J. P. BAGBY  3,082,674
AUTOMATIC EXPOSURE MECHANISM WITH
MAGNETIC CONTROL OF IRIS BLADES
Filed Sept. 11, 1958  3 Sheets-Sheet 1
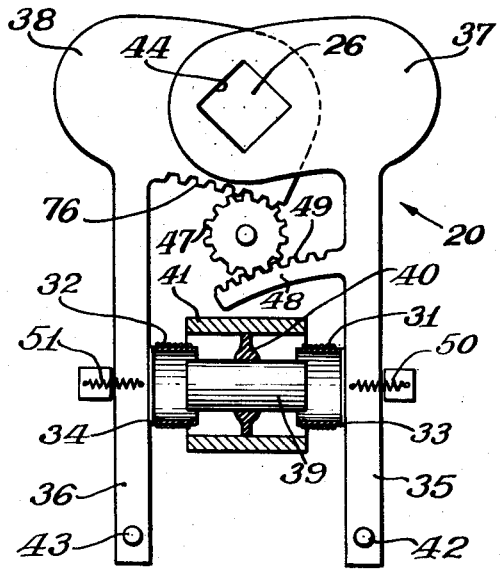
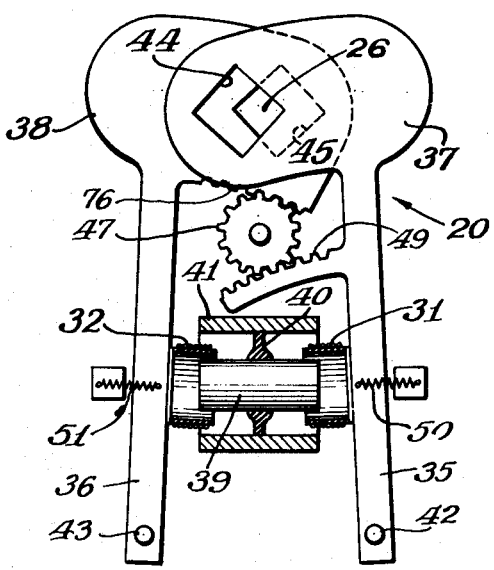
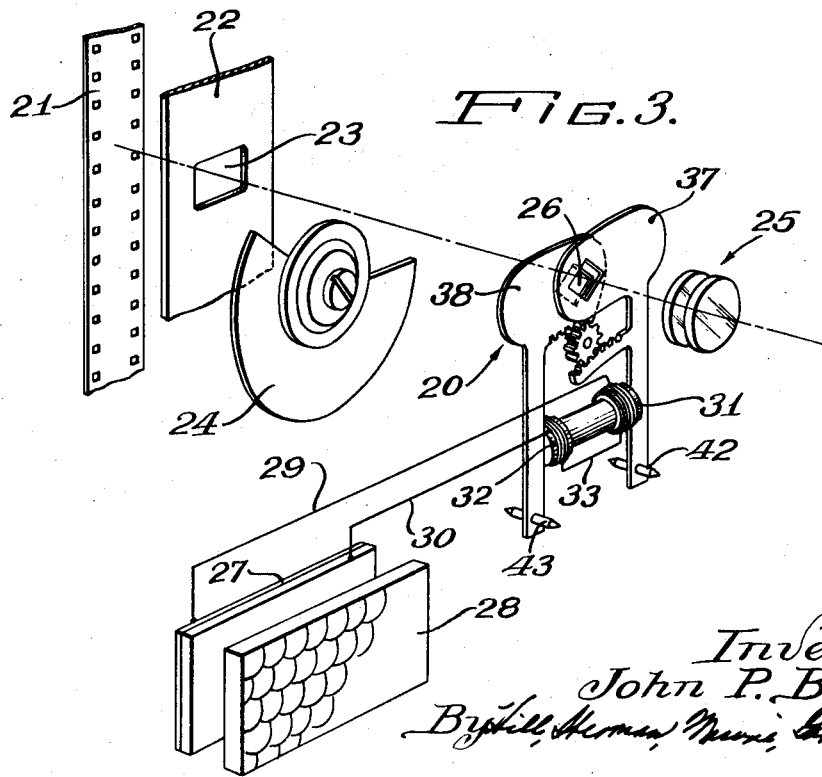
Inventor:
John P. Bagby
Attys.

Inventor:
John P. Bagby
By
Hill, Sherman, Meroni, Gross & Simpson
Attys.

March 26, 1963
J. P. BAGBY
3,082,674
AUTOMATIC EXPOSURE MECHANISM WITH
MAGNETIC CONTROL OF IRIS BLADES
Filed Sept. 11, 1958
3 Sheets-Sheet 3
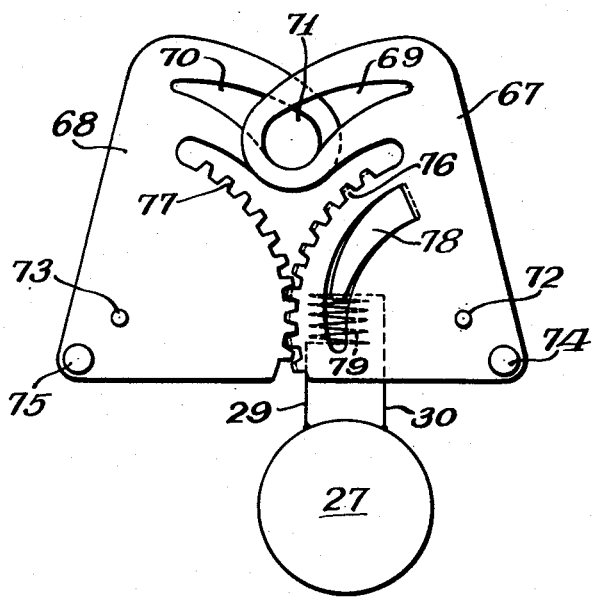
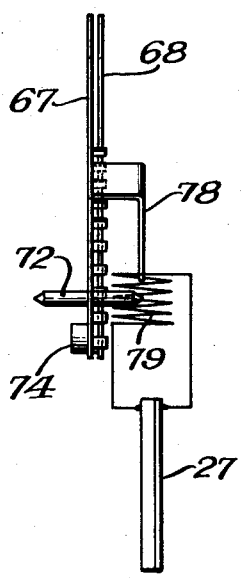
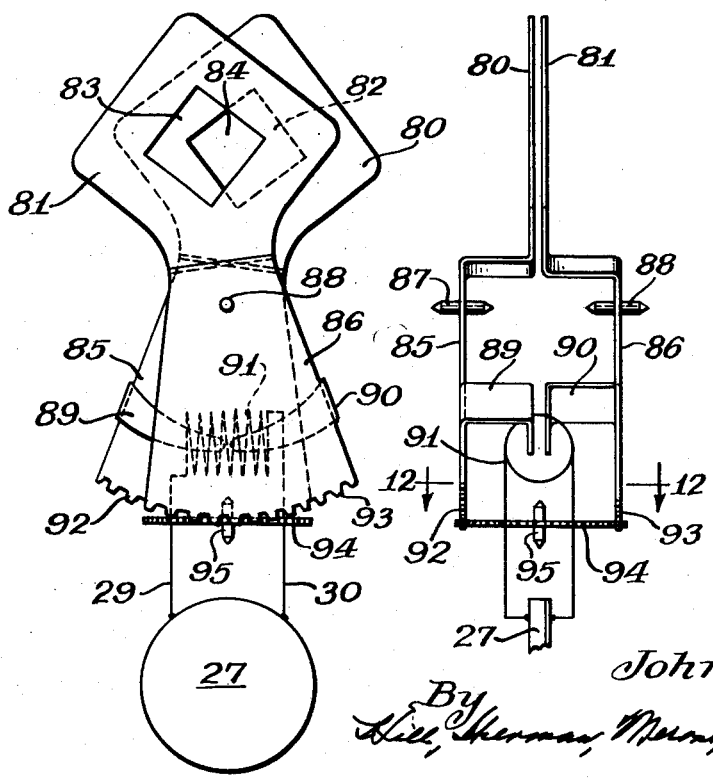
Inventor:
John P. Bagby

United States Patent Office 3,082,674
Patented Mar. 26, 1963

3,082,674
AUTOMATIC EXPOSURE MECHANISM WITH MAGNETIC CONTROL OF IRIS BLADES
John P. Bagby, Skokie, Ill., assignor to Bell and Howell Company, Chicago, Ill., a corporation of Illinois
Filed Sept. 11, 1958, Ser. No. 760,458
8 Claims. (Cl. 95—64)

This invention relates to apparatus for adjusting the size of an aperture transmitting radiant energy in accordance with an ambient condition. More particularly, this invention relates to apparatus for adjusting the aperture of a photographic camera to provide proper exposure of the film therein under different light conditions wherein magnetic means are used to control iris blades or diaphragms responsively to the output of a photoelectric transducer.

Automatic exposure controls have in the past used either a battery energized electric motor or, more recently, have used galvanometers to actuate iris blades. Apparatus of the latter type, for example, is described in detail in Patent No. 2,841,064, issued on July 1, 1958, to J. P. Bagby et al. and assigned to the assignee of the present invention. While such apparatus is admirably suited to its intended purposes, it is in many instances also desirable to provide an inherently simpler mechanism which can be more rapidly and economically manufactured to satisfactorily achieve similar purposes in many applications. Also, it is desirable to provide for general usage in related arts an aperture control apparatus wherein diaphragm members commonly referred to as iris blades are directly driven by electromagnetic means in order to adjust the size of an aperture for transmitting radiant energy in accordance with some ambient condition such as light intensity.

It is therefore a general object of this invention to provide a new and improved aperture control apparatus.

It is a further object of this invention to provide an electromagnetically actuated aperture control which eliminates the necessity of using an electric motor or galvanometer.

It is a further object of this invention to provide an apparatus for automatically adjusting the exposure aperture of a camera which apparatus is simple and inexpensive in manufacture and which in use is quickly responsive to exposure light change, accurate, simple and reliable.

Further objects of the invention not specifically mentioned will be apparent from the detailed description and claims which follow, reference being had to the accompanying drawings in which preferred embodiments of the invention are shown by way of example only and in which:

FIGURE 1 is a vertical sectional view, with the diaphragm members in elevation, showing a first embodiment of the invention in the fully open aperture position.

FIGURE 2 is a view similar to FIGURE 1 but showing the same parts actuated to partly close the aperture.

FIGURE 3 is a fragmentary isometric view showing the diaphragm assembly of FIGURES 1 and 2 in its relationship to other parts of a camera.

FIGURE 8 is a view similar to FIGURE 1 showing a fourth embodiment of the invention.

FIGURE 9 is a side elevational view of the apparatus shown in FIGURE 8.

FIGURE 10 is a view similar to FIGURE 1 but showing a fifth embodiment of the invention.

FIGURE 11 is a side elevational view of the apparatus shown in FIGURE 10 looking from left to right in FIGURE 10.

FIGURE 12 is a sectional view taken on the line XII—XII of FIGURE 11.

Figure 4:
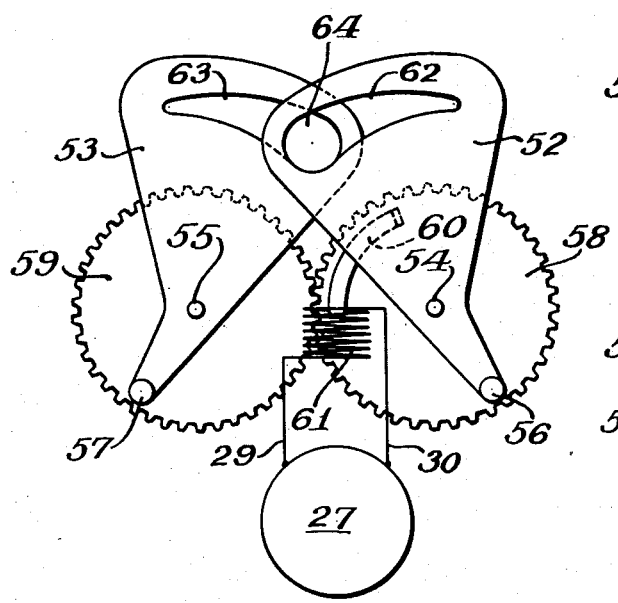
FIGURE 4 is a view similar to FIGURE 1 but showing a second embodiment of the diaphragm member assembly.

Turning now to the drawings, there is shown in FIGURES 1 and 2 an aperture control apparatus 20 suitable for use in photographic apparatus such as a motion picture camera in the manner shown in FIGURE 3. Since the motion picture camera may per se be of standard design, it is not shown in complete detail but would of course comprise a casing within which the mechanism of the camera is enclosed and which provides a film chamber within which a film 21 is arranged for intermittent motion. The film 21 in its travel is associated in any conventional manner with an exposure guide 22 having therein an exposure aperture 23 conforming with a standard motion picture frame, through which successive frames of the film are exposed as the film is intermittently fed through the exposure guide. A rotary shutter 24 immediately in front of the guide plate 22 is rotated in timed relation with the intermittent feed of the film to cover the exposure aperture during the film feed intervals in the usual manner in the art. Any suitable lens system 25 may conveniently be mounted on the front of the camera in axial alignment with the exposure aperture 23 and serves to form images on the film at the exposure aperture.

Interposed between the lens system 25 and the shutter 24 (or, alternatively, between various components of the lens system) is the aperture control unit 20 shown in greater detail in FIGURES 1 and 2. It will be noted that the adjustable aperture 26 of the aperture control unit is also axially aligned with lens system 25 and with the exposure aperture 23. It will, of course, be understood that although the aperture control unit 20 of FIGURE 1 is shown by way of example in the over-all apparatus of FIGURE 3, the aperture control units constructed specifically as shown in FIGURES 4, 6, 8, or 10 could also be used instead of that shown in FIGURE 1. That is to say, any one of the five specifically different aperture control units illustrated would be used in the same manner as shown in detail for unit 20 in FIGURE 3.

It will be noted from FIGURE 3 that the camera is also provided with a forwardly facing photoelectric cell 27 which would normally be mounted on the front face of the front wall of the camera below the lens. The usual reticular lens 28 is positioned in front of the photoelectric cell 27, the lens 28 and cell 27 being secured to the camera in any convenient manner. As is well known in the art, the electrical output of the photoelectric cell is substantially directly proportional to the intensity of the light incident thereon. This electrical output is derived over wires 29 and 30, the wire 29 being connected between one terminal of the photoelectric cell and a first solenoid coil 31 on the aperture control unit 20, and the wire 30 being connected between the second terminal of the photoelectric cell and a second solenoid coil 32 on aperture control unit 20. Solenoid coils 31 and 32 are in turn connected in series with each other and with the photoelectric cell by a wire 33 so that electrically the coils 31 and 32 essentially constitute a single coil. As is well known in the art a solenoid coil when energized by a current flowing therein will generate a magnetic field which has a magnitude determined by the magnitude of the current. Since the magnitude of the current flowing from photoelectric cell 27 through the coils 31 and 32 is proportional to the intensity of light incident on the photoelectric cell, the magnetic field generated by these coils will also be proportional to the light intensity.

Turning to FIGURES 1 and 2 it will be noted that the solenoid coils 31 and 32 are respectively mounted on coil forms 33 and 34 which in turn are rigidly attached so as to be integral with arm portions 35 and 36 which respectively extend downwardly from diaphragm members 37 and 38. The solenoid coils 31 and 32 are arranged in opposed coaxial or aligned relationship and each is positioned to surroundingly receive the opposite end of a core member 39. Core member 39 is preferably a permanent magnet of any well known type but may consist of any magnetizable material. Core member 39 is mounted within a plastic or other non-magnetic supporting member 40 which in turn is supported within a cylindrical hollow magnetic shielding member 41 which acts to concentrate the magnetic field of core member 39. The shield member 41, which for convenience and clarity of illustration is not shown in FIGURE 3, may in turn be attached in any convenient manner to the casing or other members of the camera body. It will be noted that the core member 39 and the solenoid coils 31 and 32 coact to form a solenoid actuator which is responsive to the output of the photoelectric cell and that one element of this solenoid actuator, namely the solenoid coil portion, is rigidly and integrally attached to the member to be driven thereby eliminating the use of gear trains, linkages, etc. in the driving relationship.

Spindle members 42 and 43 are rigidly and integrally attached to the arm portions 35 and 36 respectively of diaphragm members 37 and 38 and project transversely through these arm portions terminating in conical end portions which are adapted to be rotatably engaged in opposing conical socket bearings which in turn may be secured in any convenient manner to the camera housing.

It will be noted that the main portions of diaphragm members 37 and 38 are generally elliptical in shape and that each of these main portions has a square, or more generally, a rectangular opening therein. Thus, the diaphragm member 37 is provided with an opening 44 and the diaphragm member 38 is provided with an opening 45 as best seen in FIGURE 2. Since each of the diaphragm members is pivotally mounted for rotary movement about its respective spindle member, the opening in each diaphragm member will traverse a locus which is an arc of a circle having a radius equal to the distance from the center of the spindle to the center of the opening. It will further be noted from FIGURE 1 that the diaphragm members 37 and 38 are mounted in adjacent planes so that the rotary movement of these two diaphragms brings them into overlapping relationship. In the position of the parts shown in FIGURE 1, the openings 44 and 45 are coincident with each other and the aperture formed by the coincident portions of these two openings is therefore at a maximum size. This follows from the fact that the loci of movement of the openings in the diaphragm members are coincident at the point where the respective loci intersect. The aperture control unit is so positioned with respect to the other elements shown in FIGURE 3 that this point of coincidence is axially aligned with the lens system 25 and the exposure aperture 23.

It will further be noted from FIGURE 1 that one lower edge of the diaphragm member 38 is provided with gear teeth 46 which mesh with the teeth on an idler spur gear 47 which may be mounted for free rotation in any convenient manner. Projecting inwardly from the arm portion 35 of diaphragm member 37 is an extension member 48 which is also provided with gear teeth 49 meshing with the teeth on the opposite edge of idler 47 from that engaged by the teeth on diaphragm member 38.

Hair springs 50 and 51 are attached to arm portions 35 and 36 respectively and are connected to any convenient portion of or protrusion from the housing of the camera to normally bias the diaphragm members 47 and 48 to the position shown in FIGURE 1 in which the openings 44 and 45 are coincident with each other to form an aperture of maximum size. Additional stability in this normally fully open position is afforded by the engagement of teeth 46 and 49 of diaphragm members 38 and 37 respectively with those of the idler gear 47. When light is incident on the photoelectric cell 27 the resulting electrical current flowing through solenoids 31 and 32 generates a magnetic field which is poled so that each of the diaphragm members 37 and 38 is rotated in a direction such as to move the arm portions 35 and 36 thereof inwardly toward the ends of the core member 39. That is to say, the winding of solenoid coil 31 is such as to generate a magnetic field which will rotate the diaphragm member 37 in a counterclockwise direction in opposition to the spring 50 and the winding of solenoid member 32 is such as to generate a magnetic field which will rotate the diaphragm member 38 in a clockwise direction in opposition to the action of spring 51. Furthermore, the degree of rotary motion produced is proportional to the magnitude of the current flowing which in turn is proportional to the intensity of light. The result of this motion as may be seen in FIGURE 2 is to diminish the size of the common aperture 26 formed by the overlapping portions of openings 44 and 45. It will be apparent to those skilled in the art that by properly selecting the characteristics of the springs 50 and 51, the over-all geometry of the solenoid actuator formed by core member 39 and solenoid coils 31 and 32 and/or the characteristics of the photoelectric cell circuit, the functional relationship between the area of aperture 26 and the intensity of light incident on photoelectric cell 27 may be given virtually any desired form. Of course, as the intensity of light falling on the photoelectric cell varies the magnitude of the current in the coils will also vary causing (in conjunction with the action of springs 50 and 51) the diaphragm members to move accordingly. When this current is stopped altogether, the diaphragm members are returned to the position shown in FIGURE 1 by the spring members 50 and 51.

It will further be apparent that many modifications in the details of the directly driven magnetically actuated aperture control unit shown in FIGURE 1 may be made in accordance with the needs of particular applications. Thus, in FIGURE 4 there is shown an embodiment of the invention in which a pair of diaphragm members 52 and 53 are pivotally mounted for rotary overlapping movement about their respective spindle members 54 and 55 and are counter-weighted by weights 56 and 57 at the opposite end of their respective arm portions. A pair of idler gear discs 58 and 59 are rigidly attached to spindles 54 and 55 respectively and are positioned in engaged relationship in a common plane in back of the plane of the diaphragm member 53 as may be seen in FIGURE 5. An arcuate strip 60 may conveniently be punched out of gear disc 58 and bent over in the manner shown in FIGURE 5 to form a core member for the solenoid actuator of the device. It will be noted that core member 60 is rigidly integral with the driven diaphragm member 52 by virtue of the fact that both member 52 and gear disc 58 are rigidly attached to spindle 54. The core member 60 is positioned to be received in surrounding relationship by a solenoid coil 61 which is connected in electrical series circuit relationship with photoelectric cell 37 by the conductors 29 and 30. Each of the diaphragm members 52 and 53 is provided with an arcuate tapering opening 62 and 63 respectively. As in the embodiment shown in FIGURE 1, the locus of the motion of each of the openings 62 and 63 will be the arc of a circle having its center at the respective spindles 54 and 55 and these loci will intersect or be coincident at a point coaxial with the exposure aperture. The aperture 64 formed by the common or overlapping portions of openings 62 and 63 is thus coaxial with the exposure aperture 23. It will be noted that the configuration of the openings in the embodiment of FIGURE 1 produces a generally square aperture 26 of decreasing size whereas the tapering arcuate openings in the embodiment of FIGURE 4 afford a substantially circular aperture when fully open which becomes substantially an ellipse of lesser area as the diaphragm members are actuated.

Figure 5:
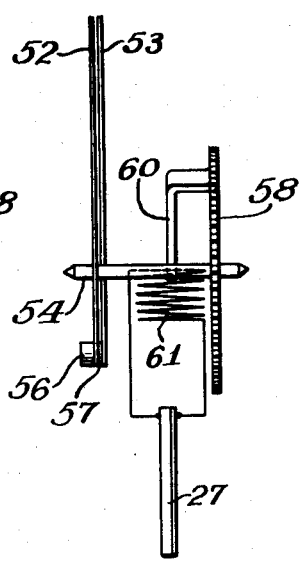
FIGURE 5 is a side elevational view of the apparatus shown in FIGURE 4.

The diaphragm members 52 and 53 of FIGURE 4 would of course also be provided with spring or other biasing means such as the hair springs 50 and 51 shown in FIGURE 1. These springs have been omitted from the drawing in FIGURE 4 for the sake of convenience and clarity of illustration. These springs urge the diaphragm members 52 and 53 to the normally fully open position shown in FIGURE 4. Greater stability in this position is afforded by the counter-weights 56 and 57 and by the meshing idler gears 58 and 59. When a current is supplied from the photoelectric cell 27 to the solenoid 61 a magnetic field is generated by the solenoid which induces magnetic poles in the core or plunger member 60 in such fashion that the plunger 60 is drawn downwardly into the coil 61 in accordance with the well known manner of operation of a solenoid coil and plunger as commonly used in the electrical arts. Of course, if desired, the plunger 60 could support a permanent magnet in any suitable shape in order to afford a stronger response in operation. In practice, however, this has not been found necessary. As the plunger 60 is drawn into the solenoid coil 61 the gear 58 is thereby rotated and in turn directly rotates the diaphragm member 52 in a counter-clockwise direction and simultaneously rotates the integral assembly consisting of gear 59, spindle 55, and diaphragm 53 in a clockwise direction. The overlapping rotary movement of the diaphragm members brings narrower portions of the arcuate tapering openings 62 and 63 into coincident relationship thereby reducing the area of the aperture 64. When the current is removed, the diaphragm members are returned to the position shown in FIGURE 4 under the action of suitable spring members and of the counter-weights 56 and 57.

Figure 6:
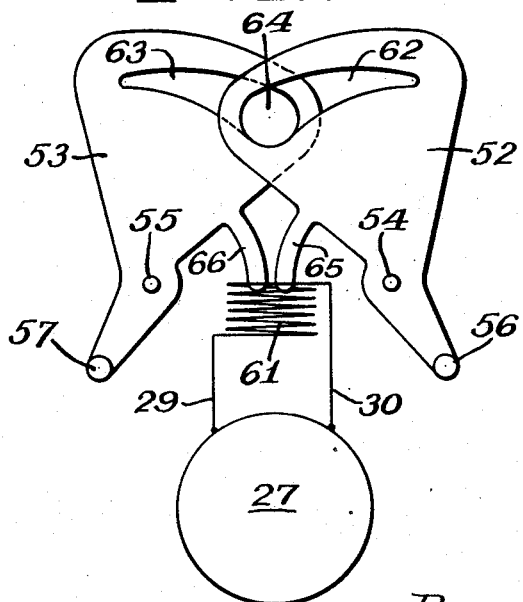
FIGURE 6 is a view similar to FIGURE 1 but showing a third embodiment of the invention.
Figure 7:
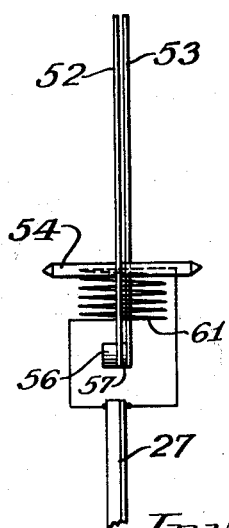
FIGURE 7 is a side elevational view of the apparatus shown in FIGURE 6.

In many applications, the somewhat greater stability afforded by the use of the idler gears 58 and 59 may not in fact be necessary and these elements can readily be eliminated in the manner shown in FIGURE 6. In FIGURE 6, parts corresponding to those already described in connection with FIGURE 4 are indicated by the same reference character and will not be further described. It will be noted that the gear members 58 and 59 have been omitted and that each of the diaphragm members 52 and 53 is itself provided with a projecting extension or arm 65 and 66 respectively each of which is adapted to act as a plunger or core in cooperation with the solenoid coil 61. Thus, when the solenoid coil 61 is energized, the plungers 65 and 66 are drawn down within the coil thereby producing overlapping rotary motion of the diaphragm members 52 and 53 and consequently reducing the size of the aperture 64. When the solenoid 61 is de-energized, the diaphragm members are returned to the position shown in FIGURE 6 under the influence of the counter-weights 56 and 57 and/or under the influence of any other suitable biasing means such as the springs shown in FIGURE 1. It will be noted that in the embodiment shown in FIGURE 6 the diaphragm member and solenoid plunger may be produced from a single stamping of a sheet of soft metal. The diaphragms are then mounted on their respective spindles and the solenoid coil positioned to complete the assembly of the entire device in a most inexpensive manner.

In FIGURES 8 and 9 there is shown an embodiment of the invention which combines many of the advantages of the embodiments shown in FIGURES 4 and 6 respectively. In FIGURE 8 the diaphragm members 67 and 68 are each provided with tapering arcuate openings 69 and 70 respectively which overlap to define an aperture 71. The diaphragm members 67 and 68 are respectively mounted on spindles 72 and 73 and are provided with counter-weights 74 and 75. Each of the diaphragm members has an arcuate edge portion having gear teeth 76 and 77 cut respectively therein. The diaphragm members are so shaped and positioned as shown in FIGURE 8 that the gear teeth 76 and 77 engage with each other to afford the stability afforded by the separate gears 58 and 59 shown in FIGURE 4. An arcuate plunger member 78 is stamped or punched out of the diaphragm member 67 and is bent in an L shape so as to extend in a plane parallel to the plane of the diaphragm member 67 and in back thereof as best seen in FIGURE 9. Solenoid coil 79 is positioned in back of the diaphragm members to surroundingly receive the plunger 78 and is connected by wires 29 and 30 to be actuated by the output of the photoelectric cell 27. The device shown in FIGURES 8 and 9 operates in substantially the same manner as that shown and described in FIGURES 4 and 5 but is obviously less expensive to manufacture inasmuch as the separate gears 58 and 59 are eliminated.

In FIGURES 10, 11 and 12 there is shown an embodiment of the invention wherein diaphragm members 80 and 81 are each provided with rectangular openings 82 and 83 respectively the overlapping common portion of which forms an aperture 84. The arm portions 85 and 86 of the diaphragm members 80 and 81 respectively are offset as best seen in FIGURE 11 so that the spindle members 87 and 88 to which the offset arm portions are integrally or rigidly secured and which support the diaphragm members for pivotal rotary motion may be positioned in coaxial or aligned relation. It will be noted that the result of this configuration is that the loci of movement of the two apertures or openings 82 and 83 respectively are coincident throughout their entire length and not merely at the point where their intersection is aligned with the exposure aperture 23 as shown in FIGURE 3. Of course, the maximum size of aperture 84 is produced when the openings 82 and 83 are fully coincident and in this position, the aperture 84 is aligned with the exposure aperture 23 as shown in FIGURE 3.

Projecting inwardly from each of the offset arm portions 85 and 86 is a plunger or core member 89 and 90 respectively. The plunger members 89 and 90 are bent into a generally arcuate L-shape as shown in FIGURES 10 and 11 and are positioned to be surroundingly received by a solenoid coil 91 mounted in any convenient manner between the offset arm portions 85 and 86 so that the plunger members 89 and 90 enter the respective opposite ends of the solenoid coil 91 as best seen in FIGURE 10 when the solenoid coil 91 is energized as shown in FIGURE 10. In order to afford additional stability to the device shown in FIGURE 10, the lower edge of each of the offset arm portions 85 and 86 is preferably arcuate in shape and has gear teeth 92 and 93 cut respectively therein. These teeth are positioned to mesh with the teeth on an idler spur gear 94 which is mounted on a spindle 95 so as to position the spur gear 94 perpendicularly to the major surfaces of the offset arm portions 85 and 86 as best seen in FIGURES 11 and 12.

The diaphragm members 80 and 81 are normally biased by any convenient means such as hair springs (not shown) to a position in which the aperture 84 is fully open due to the complete coincidence of the openings 82 and 83. When current from the photoelectric cell 27 energizes the solenoid coil 91 the plungers 89 and 90 are both drawn into the solenoid 91 thereby rotating the spur gear 94 in a clockwise direction as seen in FIGURE 12. The diaphragm members 80 and 81 may be biased to return to the fully open aperture position by any convenient biasing means.

In any of the embodiments discussed above, it will be noted that there is provided an aperture control for a photographic camera wherein the diaphragm members, the openings in which define the aperture in overlapping relationship, are mounted for rotary movement and are directly driven by a solenoid actuator in response to the output of a photoelectric cell. By directly driven, of course, is meant that one element, either the solenoid coil or the plunger is either an integral part of or rigidly and integrally attached to at least one of the diaphragm members. This type of construction not only results in considerable manufacturing economies, but also results in positive accurate response of the aperture control to the controlling signal. It will, of course, be understood that many other configurations embodying the principles illustrated herein could be devised to achieve any particular desired relationship between the shape and size of the controlled aperture and the magnitude of the controlling signal. Of course, if more than two diaphragm members of the type illustrated herein are used an even greater flexibility of control of aperture shape results. If, for example, it is desired to use four diaphragm members or iris blades, they may quite readily be disposed with their arm portions at 180° from the arm portions of the devices illustrated herein and with the main portions in overlapping relationship with the two shown herein. Of course, any number of diaphragm members could similarly be provided.

The term "solenoid actuator" and the term "solenoid actuator means" as used herein, shall be deemed to comprise one or more electric tubular coils and one or more associated armature members; the coils and members being mounted for relative axial movement with respect to each other.

Since other changes can also be made in the foregoing construction and different embodiments of the invention can be made without departing from the spirit and scope thereof, it is intended that all matters shown in the accompanying drawings and described hereinabove shall be interpreted as illustrative and not in a limiting sense.

I claim as my invention:

1. An aperture control for a photographic camera comprising, means forming an exposure aperture, a photoelectric transducer, first and second diaphragm members each having a rectangular opening therein and each being pivotally mounted for rotary movement in overlapping relationship with each other between first and second extreme positions with the loci of motion of said openings coinciding at least in front of said exposure aperture to form a controlled aperture, each of said diaphragm members having an arm portion, a spindle member rigidly attached to and projecting through each of said arm portions to afford said pivotal mounting, spring biasing means urging each of said diaphragm members toward said first position, first and second solenoid coils integrally attached to the respective arm portions of said first and second diaphragm members respectively, a permanent magnet core member positioned between said arm portions, said solenoid coils being in surrounding relationship with opposite ends of said core member respectively to form a solenoid actuator, each of said solenoid coils being connected in circuit with the output of said photoelectric transducer so that said solenoid actuator is responsive to the output of said photoelectric transducer to urge said diaphragm members toward said second position.

2. An aperture control for a photographic camera comprising, means forming an exposure aperture, a photoelectric transducer, first and second diaphragm members each having an arcuate tapering opening therein and each being pivotally mounted for rotary movement in overlapping relationship with each other between first and second extreme positions with the loci of motion of said openings coinciding at least in front of said exposure aperture to form a controlled aperture, biasing means urging said diaphragm members toward said first position, each of said diaphragm members having an arm portion, a spindle rigidly connected to and projecting through each of said arm portions for pivotally mounting said diaphragm member, first and second spur gears rigidly attached to each of said spindles respectively and being positioned in engaged relationship with each other, an arcuate portion of one of said gear members protruding to form the core of a solenoid actuator, and a solenoid coil positioned to surroundingly receive said core member and connected in electrical circuit so that said solenoid actuator is responsive to the output of said photoelectric transducer to urge said diaphragm members toward said second position.

3. An aperture control for a photographic camera comprising, means forming an exposure aperture, a photoelectric transducer, first and second diaphragm members each having a tapering arcuate opening therein and each being pivotally mounted for rotary movement in overlapping relationship with each other between first and second extreme positions with the loci of motion of said openings coinciding at least in front of said exposure aperture to form a controlled aperture, biasing means urging each of said diaphragm members toward said first position, each of said diaphragm members having a projecting arcuate solenoid actuator core member formed integrally therewith, a solenoid coil positioned in surrounding relationship to the locus of motion of both of said core members, said solenoid coil being connected in circuit with the output of said photoelectric transducer so that said solenoid actuator is responsive to said output of the photoelectric transducer to urge said diaphragm members toward said second position.

4. An aperture control for a photographic camera comprising, means forming an exposure aperture, a photoelectric transducer, first and second diaphragm members each having a tapered arcuate opening therein and each being pivotally mounted for rotary movement in overlapping relationship with each other between first and second extreme positions with the loci of motion of said openings coinciding at least in front of said exposure aperture to form a controlled aperture, biasing means urging each of said diaphragm members toward said first position, an arcuate edge of each of said diaphragm members having gear teeth thereon, said teeth on said respective diaphragm members being in engaged relationship, one of said diaphragm members having a solenoid actuator core member integral therewith and protruding from said diaphragm member to a plane parallel with the major surface thereof, a solenoid coil positioned to surroundingly receive said core member, said solenoid coil being connected in circuit with the output of said photoelectric transducer so that said solenoid actuator is responsive to the output of said photoelectric transducer to urge said diaphragm members toward said second position.

5. An aperture control for a photographic camera comprising, means forming an exposure aperture, a photoelectric transducer, first and second diaphragm members each having a rectangular opening therein and each being pivotally mounted for rotary movement in overlapping relationship with each other between first and second extreme positions with the loci of motion of said openings coinciding at least in front of said exposure aperture to form a controlled aperture, biasing means urging each of said diaphragm members toward said first position, each of said diaphragm members having an arm portion the major surface of which is off-set from the plane of the surface of said opening, a spindle member protruding through each of said arm portions to afford said pivotal mounting of said diaphragm member, said spindle members being coaxial with each other, each of said arm portions having an arcuate end surface with gear teeth thereon, an idler spur gear disc mounted perpendicularly to each of said first and second arm portions and positioned in engaged relationship with the gear teeth thereon, a solenoid actuator coil positioned between said first and second arm portions, each of said arm portions having a solenoid actuator core member formed integrally therewith and positioned to protrude into opposite ends of said coil member respectively, said solenoid coil member being connected in circuit with said photoelectric transducer so that said solenoid actuator is responsive to the output of said photoelectric transducer to urge each of said diaphragm members toward said second position.

6. An aperture control comprising, a transducer responsive to an ambient condition, a plurality of diaphragm members each having an opening therein and each being mounted for movement in overlapping relationship with each other with the loci of motion of said openings coinciding at least in one common point so that said openings cooperate to form a controlled aperture, biasing means urging each of said diaphragm members in a first direction of motion respectively, at least one solenoid core means rigidly integral with at least one of said diaphragm members, a solenoid coil connected to be energized by the output of said transducer, said core means and said solenoid coil being positioned to form a solenoid actuator responsive to the output of said transducer to urge at least one of said diaphragm members to motion in a second direction opposite to said first direction.

7. In an aperture control for a photographic camera, means forming an exposure aperture, a photoelectric transducer, first and second diaphragm members each having an opening therein and each being mounted for movement in overlapping relationship with each other between first and second extreme positions with the loci of motion of said openings coinciding at least in front of said exposure aperture to form a controlled aperture, biasing means urging said diaphragm members toward said first position, solenoid actuator means including an electromagnetic coil element having a certain axis and an armature element extending within said coil element and reciprocable relative to said coil element along said axis, one of said elements being rigidly movable with at least one of said diaphragm members in a direction substantially coincident with said axis, and means coupling said coil element to said photoelectric transducer.

8. In an aperture control for a photographic camera, means forming an exposure aperture, a photoelectric transducer, first and second diaphragm members each having an opening therein and each being pivotally mounted for rotary movement in overlapping relationship with each other between first and second extreme positions with the loci of motion of said openings coinciding at least in front of said exposure aperture to form a controlled aperture, biasing means urging said diaphragm members toward said first position, solenoid actuator means including an electromagnetic coil element having a certain axis and an armature element extending within said coil element and reciprocable relative to said coil element along said certain axis, one of said elements being rigidly movable with at least one of said diaphragm members in an arcuate path about the axis of pivotal movement of said one of said members with said arcuate path being substantially coincident with said certain axis, and means coupling said coil element to said photoelectric transducer.

References Cited in the file of this patent

UNITED STATES PATENTS

| | | |
|---|---|---|
| 1,905,251 | Styer | Apr. 25, 1933 |
| 2,206,086 | Galyon | July 2, 1940 |
| 2,251,473 | Touceda | Aug. 5, 1941 |
| 2,966,106 | Schackert | Dec. 27, 1960 |

FOREIGN PATENTS

| | | |
|---|---|---|
| 698,573 | Great Britain | Oct. 21, 1953 |